UNITED STATES PATENT OFFICE.

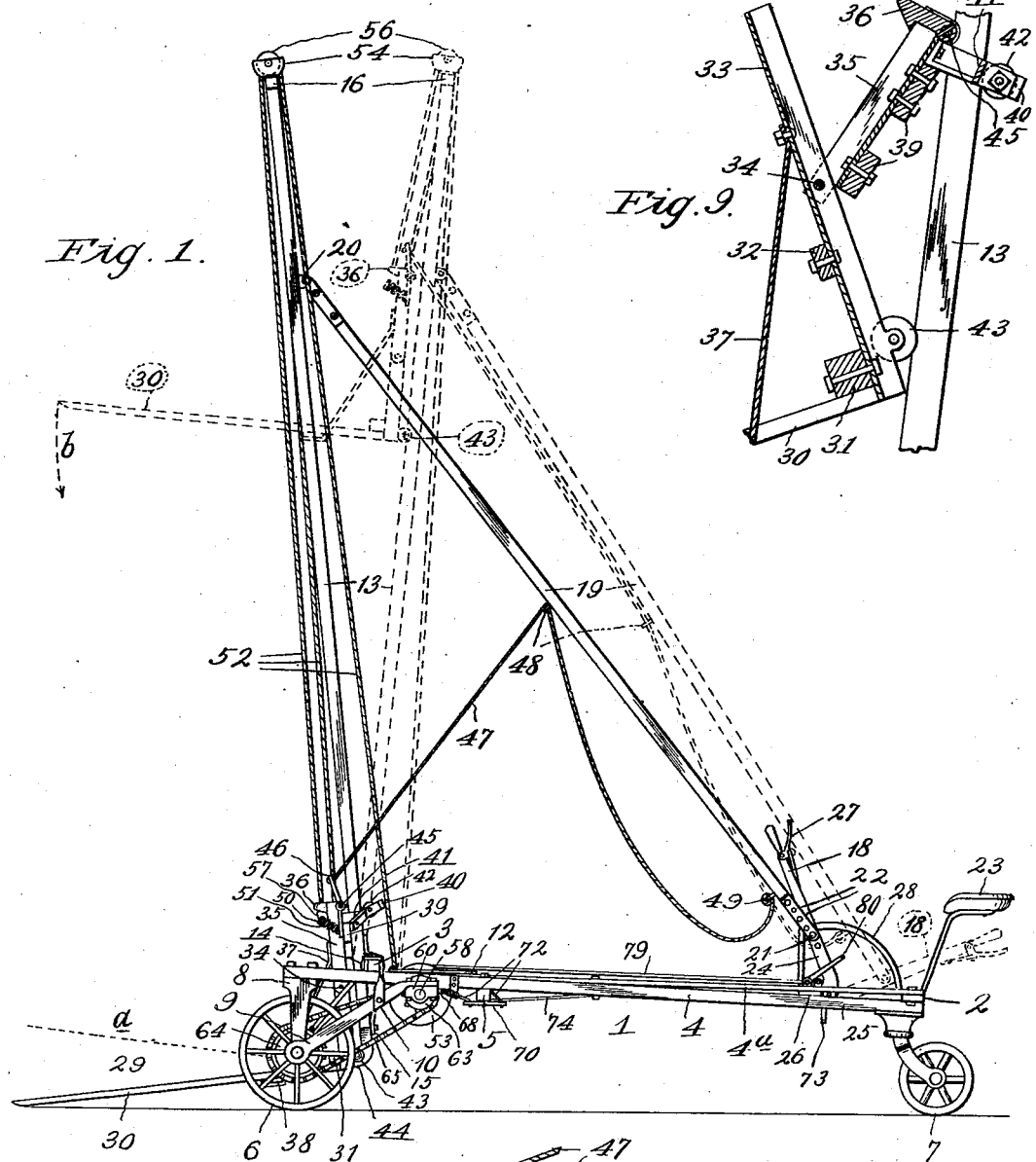

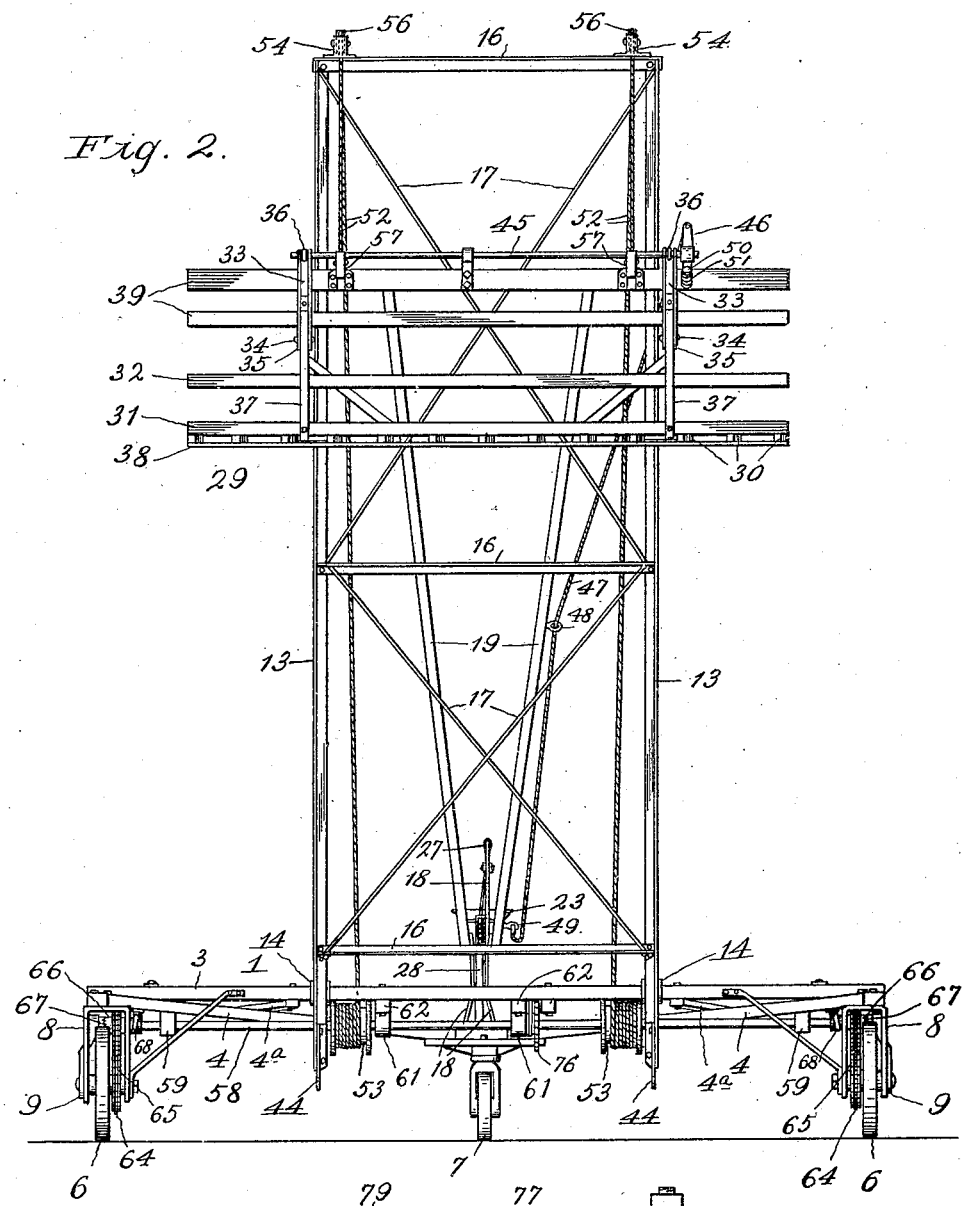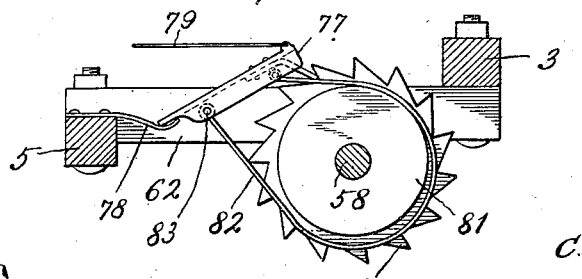

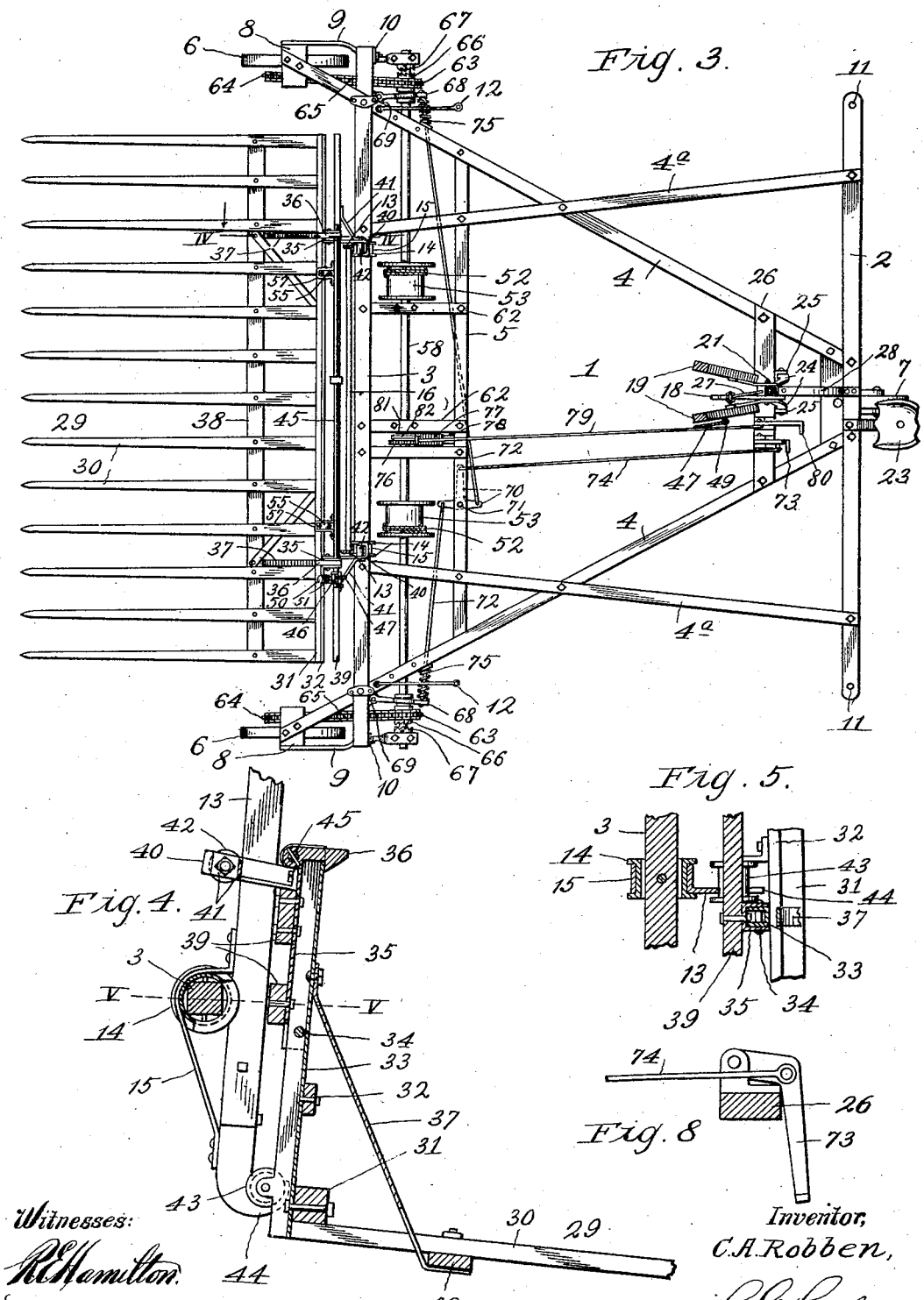

CLEMENS A. ROBBEN, OF ANGELUS, KANSAS.

COMBINED HAY RAKE AND STACKER.

938,076.

Specification of Letters Patent. Patented Oct. 26, 1909.

Application filed February 24, 1909. Serial No. 479,849.

*To all whom it may concern:*

Be it known that I, CLEMENS A. ROBBEN, a citizen of the United States, residing at Angelus, in the county of Sheridan and State of Kansas, have invented certain new and useful Improvements in Combined Hay Rakes and Stackers, of which the following is a specification.

My invention relates to improvements in combined hay-rakes and stackers, and the essential features of the invention reside in a rake for gathering the hay, means for elevating said rake, and means for tilting the rake in order that it may discharge the hay upon a stack.

Other features of the invention will hereinafter appear, and in order that it may be fully understood, reference will now be made to the accompanying drawing, in which:

Figure 1 shows a side elevation of the machine in full lines ready to gather hay, and in dotted lines with the rake elevated preparatory to dumping. Figs. 2 and 3 are front and plan views, respectively, the standards, forming part of the machine, being shown in section in Fig. 3. Fig. 4 is an enlarged section on line IV—IV of Fig. 3. Fig. 5 is a section on line V—V of Fig. 4. Fig. 6 is a broken detail of a portion of the tripping mechanism for dumping the rake. Fig. 7 is an enlarged detail of a combined ratchet-and-brake mechanism employed in controlling the rake. Fig. 8 is a detail of a self-locking foot-lever employed in carrying out the invention. Fig. 9 is a broken section of the rake in a dumping position.

In carrying out the invention, I employ a frame 1, comprising, substantially, a rear bar 2, a front bar 3, a pair of forwardly-diverging bars 4, forwardly-converging bars 4ª, and a transverse brace 5, for reinforcing the diverging bars 4 and the converging bars 4ª. Frame 1 is mounted at its forward end upon a pair of wheels 6, and at its rear end upon a caster 7, whereby the machine may be turned around in the field. Wheels 6 are mounted in a pair of yokes 8, secured to the forward ends of the diverging bars 4, and reinforced by rearwardly and upwardly-extending braces 9, supported by hangers 10 depending from the ends of bar 3. Bar 2 has holes 11 at its ends for the reception of a pair of swingle-trees, not shown, and bars 4 are provided with rearwardly-extending rods 12, said rods and swingle-trees providing means to which a pair of horses may be hitched for propelling the machine.

13 designates a pair of standards which are tiltably mounted on bar 3, said bar being provided with a pair of flanged sleeves 14 to receive the upper curved ends of a pair of hangers 15, secured to the rear lower portions of the standards. Standards 13 are united by transverse bars 16, and securely braced by a plurality of diagonal rods 17.

The standards are tilted to the positions shown in Fig. 1, by means of a hand-lever 18 and a pair of connecting-bars 19, which latter are pivotally secured at their upper ends to a pair of lugs 20 and adjustably connected to the lever by a bolt 21, adapted to engage any of the holes 22 in said connecting-bars, and thereby normally give more or less pitch to the standards. Lever 18 is arranged adjacent to the seat 23, and its lower bifurcated end 24 is pivotally connected to lugs 25 extending rearwardly from a transverse plank 26 on the diverging bars 4. Lever 18 is provided with a latch 27, which coöperates with a segment 28 in locking said lever in any of its adjusted positions.

29 designates the rake, which is arranged to travel up and down on the standards. Said rake comprises a plurality of teeth 30, connected at their rear ends to a rake-head consisting of a beam 31, and a slat 32, secured to a pair of jointed bar-members 33, pivotally secured near their central portions by rivets 34 to the lower terminals of another pair of jointed bar-members 35, which are U-shaped in cross section to receive upper portions of members 33, wherein said upper portions are normally held by a pair of latches 36, see Figs. 4 and 6. Members 33 are reinforced by braces 37 secured at their lower terminals to a slat 38, secured to the undersides of the rake-teeth.

Members 35 are provided with a guard consisting of two transverse slats 39, which together with the rake-head, prevent the hay on the rake from being pushed backward upon frame 1. Members 35 are also provided with a pair of rearwardly-extending brackets 40 reinforced with braces 41, and carrying a pair of antifriction rollers 42 adapted to travel on the standards, and with the assistance of the guard and a pair of antifriction rollers 43, hold the rake in position on the standards. Rollers 43 are adapted to rest in pockets formed by the upturned terminals 44 of the lower ends of the standards, and thereby support the rake in its lowermost position.

Latches 36 are fixed to the ends of a transverse rod 45 pivotally mounted in the upper bifurcated ends of members 35, and provided at one end with a lever 46, to which the forward end of an operable-cable 47 is attached. The cable extends upward to an eye 48, and is attached at its rear terminal to an eye 49. Both of said eyes are secured to the connecting-bars 19. The lower slotted end of lever 46 loosely embraces a bolt 50 projecting from the uppermost slat 39, and embraced by a coil spring 51 which bears against the head of the bolt and the lower end of the lever, and thereby normally holds said lever in engagement with the upper ends of the jointed bar members 33.

The rake is raised and lowered by a pair of cables 52 and a pair of drums 53, to which latter the lower ends of the cables are attached. The upper ends of the cables 52 are attached to a pair of hoods 54, thence extend downward around a pair of sheaves 55, thence upward around a pair of sheaves 56, and thence downward to the drums. Sheaves 56 are mounted in the hoods 54, which are attached to the uppermost bar 16, and sheaves 55 are mounted in a pair of hoods 57 secured to the uppermost slat 39 of the guard. Drums 53 are fixed upon a transverse shaft 58, journaled in bearings 59 and 60 on the underside of the forwardly-diverging bars 4 and the braces 9, respectively. Said shaft is also mounted in bearings 61 on the undersides of braces 62, secured to bars 3 and 5. Shaft 58 is provided near its ends with a pair of loosely-mounted sprocket-wheels 63, which are driven by a pair of sprocket-wheel 64, through the intermediacy of endless sprocket-chains 65.

Sprocket-wheels 64 are fixed to the hubs of wheels 6, in order to rotate therewith. Sprocket-wheels 63 are provided with clutch-members 66 adapted to engage a pair of clutch-members 67 fixed to shaft 58, and thereby rotate the same. The sprocket-wheels 63 are shifted to throw their clutch-members 66 into engagement with clutch-members 67 by a pair of shifting-levers 68, pivoted to lugs 69, a T-lever 70 fulcrumed upon a pin 71, connecting-rods 72 connecting the shifting-levers 68 with the T-lever 70, a foot-lever 73 mounted on plank 26, and a connecting rod 74 secured at its ends to the T-lever and said foot-lever. Foot-lever 73 is self-locking, and thus normally holds clutch-members 66 out of engagement with the clutch-members 67 against the action of a pair of expansion springs 75, interposed between the free ends of the shifting-levers 68 and the adjacent sides of bars 4.

The rake is held at any desired elevation by a ratchet-wheel 76, fixed upon shaft 58, and a pawl 77, which is normally held in engagement with the ratchet-wheel by a spring 78. Pawl 77 is disengaged from the ratchet-wheel through the intermediacy of a connecting-rod 79 attached at its rear end to a foot-lever 80, supported by plank 26 within convenient reach of the driver.

In practice the standards are inclined forwardly to bring the forward ends of the rake-teeth close to the ground, as shown by full lines in Fig. 1. After the rake has gathered a load, lever 18 is actuated to tilt the standards backward and tip the front ends of the rake-teeth upward to the position shown by the dotted line $a$. Then in approaching the stack, the clutch-members are thrown into engagement to wind cables 52 upon the drums 53 for the purpose of elevating the rake above the stack. The rake is then tipped in the direction of arrow $b$ to discharge its load by pulling backward on cable 47, and disengaging the latches 36 from the upper ends of members 33, which then swing forward, as shown in Fig. 9, and permit the rake to dump. The machine is then backed until the rake clears the stack when the rake is lowered by throwing out the clutch-members and throwing pawl 77 out of engagement with the ratchet-wheel 76, so that the drums may rotate backward and pay out the cables 52. The speed at which the rake descends is governed by a brake, comprising a drum 81 on one side of the ratchet-wheel, and a band 82 attached at its ends to the free end of pawl 77 and its pivotal point 83. When the pawl is disengaged from the ratchet-wheel, band 82 frictionally engages the drum 81 and thereby retards its movement. As the rake continues to descend, rollers 43 will engage the upturned ends 44 of the standards. The hand lever 18 is now thrown forward to tilt the standards forward, so that the front ends of the rake-teeth will contact with the ground and push the upper ends of members 33 again into engagement with the latches 36.

Having thus described my invention, what I claim is:—

1. A machine of the character described, consisting of a portable frame, standards tiltably mounted thereon having pockets at their lower terminals, a rake arranged to travel up and down on said standards, pivotally jointed bars operably-connecting the rake to said standards, rollers mounted on said jointed bars and arranged to travel on the standards, two of said rollers being adapted to rest in the pockets when the rake is in its lowermost position, and means engaging the bars to hold the rake in a carrying position.

2. A machine of the character described, consisting of a wheeled-frame, standards tiltably mounted thereon having pockets at their lower terminals, a rake arranged to travel up and down on said standards, pivotally jointed bars operably-connecting the rake to said standards, means engaging said bars to hold the rake in carrying position, means on said bars to rest in the pockets when the rake is in its lowermost position, drums geared to the wheels of the frame, cables for actuating the rake attached at their ends to the standards and the drums and operatively-engaging the standards and the rake, manually-operable means for throwing the drums out of gear, a pawl and ratchet-wheel for locking the drum when thrown out of gear with the wheels, a drum fixed to rotate with the ratchet-wheel, and a band encircling the last-mentioned drum and connected to the pawl for retarding the rotation of the first-mentioned drums when lowering the rake.

3. A machine of the character described, consisting of a wheeled-frame, standards mounted thereon, a rake arranged to travel up and down on said standards, pivotally jointed bars operably-connecting the rake to said standards, means engaging said bars to hold the rake in carrying position, a pair of drums, cables for actuating the rake attached at their ends to the standards and said drums, a transverse shaft journaled in the wheeled-frame and carrying the drums, sprocket gearing connecting the wheels of the frame and the transverse shaft for actuating the latter, means for throwing the sprocket gearing to an inoperative position, pawl-and-ratchet means for locking the shaft against backward rotation, means for throwing the pawl-and-ratchet means to an inoperative position, and a brake mechanism for controlling backward rotation of the shaft.

4. A machine of the character described, consisting of a wheeled-frame, standards mounted thereon, a rake arranged to travel up and down on said standards, pivotally jointed bars operably-connecting the rake to said standards, means engaging said bars to hold the rake in carrying position, sheaves carried by the standards and the rake, drums geared to the wheels of the frame, cables attached at their ends to said drums and the standards and running around the sheaves on the rake and the standards, means for throwing the drums out of gear with the wheels, and means for controlling the drums when thrown out of gear.

5. A machine of the character described, consisting of a portable frame, standards mounted thereon, a rake arranged to travel up and down on said standards, a guard arranged to travel with said rake, jointed bars operatively connecting the rake and said guard, means engaging one of the members in each bar to hold the rake in carrying position, and a cable for disengaging said means from said member of each bar.

6. A machine of the character described, consisting of a portable frame, standards mounted thereon, a rake arranged to travel up and down on said standards, a guard arranged to travel with said rake, jointed bars operatively connecting the rake and said guard, a hook engaging one of the members of each bar to hold the rake in carrying position, and means for disengaging said hooks from said member of each bar.

7. A machine of the character described, consisting of a portable frame, standards mounted thereon, a rake arranged to travel up and down on said standards, a guard arranged to travel with said rake, jointed bars operatively connecting the rake and said guard, a hook engaging one of the members of each bar to hold the rake in carrying position, resilient means for holding said hooks in engagement with said member of each bar, and means for disengaging said hook from said member of each bar.

8. A machine of the character described, consisting of a portable frame, standards mounted thereon, a rake arranged to travel up and down on said standards, a guard arranged to travel with said rake, jointed bars operatively connecting the rake and said guard, a hook engaging one of the members of each bar to hold the rake in carrying position, a transverse rod carrying the hooks and rockingly mounted in one of the members of each bar, a lever fixed to said rod, resilient means engaging said lever to hold the hooks in engagement with said members of the bars, and a cable for actuating said lever to throw the hooks to an inoperative position.

9. A machine of the character described, consisting of a portable frame, standards tiltably-mounted thereon, a rake arranged to travel up and down on said standards, means for raising and lowering said rake, a pair of jointed bar members fixed to the rear end of the rake, a second pair of jointed bar members pivotally secured to the intermediate portions of the first-mentioned pair and arranged to travel up and down on the standards, said second pair being of U-shape to receive the upper ends of the first pair, and means for securing the upper ends of the first pair of members in the second pair to hold the rake in carrying position.

In testimony whereof I affix my signature, in the presence of two witnesses.

CLEMENS A. ROBBEN.

Witnesses:
F. G. FISCHER,
M. COX.